UNITED STATES PATENT OFFICE 2,681,910

HALOGENATED QUINOLINOL COMPOUNDS

Joseph H. Burckhalter, Lawrence, Kans., assignor to Parke, Davis & Company, Detroit, Mich., a corporation of Michigan No Drawing. Application February 13, 1951,
Serial No. 210,790

9 Claims. (Cl. 260—286)

This invention relates to new heterocyclic nitrogen compounds and to methods for obtaining the same. More particularly, the invention relates to a new class of quinoline compounds which have in their free base form the formula,

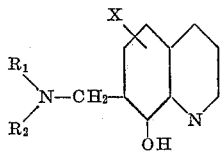

where X is a halogen atom and $R_1$ and $R_2$ are the same or different and represent lower alkyl or lower hydroxy alkyl radicals or, when taken together with —N<, a saturated heterocyclic radical such as a piperidino, morpholino or pyrrolidino group.

The products of the invention can be obtained in the free base form having the formula given above or in the form of one of their acid addition salts with inorganic or organic acids. Some examples of these salts are the hydrochloride, hydrobromide, hydroiodide, sulfate, sulfamate, phosphate, citrate, acetate, tartrate and the like. With strong mineral acids the products form both mono- and di-salts.

In accordance with the invention the new quinoline products can be prepared by the condensation of a halogenated 8-quinolinol of formula,

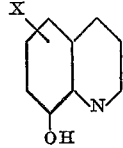

with formaldehyde and an amine of formula,

or with equivalent products or mixtures of products resulting from first condensing said amine and formaldehyde; where X, $R_1$ and $R_2$ have the same significance as given above. The reaction is preferably carried out in an alcoholic type solvent. Some examples of such solvents are methanol, ethanol, n-propanol, isopropanol and the like. The condensation can be brought about by heating the reactants together or by merely allowing the reaction mixture to stand at room temperature. The preferred mode of effecting the condensation is to heat the reaction mixture at the boiling point. If desired, an acid addition salt of the secondary amine, $HNR_1R_2$, such as the hydrochloride or hydrobromide salt, may be employed in the reaction instead of the free amine. In this instance, the product of the reaction is an acid addition salt of the halogenated-7-($R_1R_2$ substituted aminomethyl)-8-quinolinol rather than the free base.

The products of the invention are of great therapeutic value particularly in the treatment of amebic dysentery. The products wherein X is a chlorine atom possess the highest degree of activity in this respect and hence constitute a preferred sub-group of products. These new quinoline compounds may be administered in the form of their free bases or, more preferably, as one of their acid addition salts.

The invention is illustrated by the following examples.

Example 1

A mixture consisting of 8 g. of 5-chloro-8-quinolinol, 1.35 g. of paraformaldehyde and 5 cc. of diethylamine in 500 cc. of ethanol is heated under reflux for one and a half hours. The reaction mixture is cooled, filtered and the ethanol distilled from the filtrate. The residue is dissolved in anhydrous ether and the solution treated with an excess of dry gaseous hydrogen chloride. The yellow, insoluble 5-chloro-7-diethylaminomethyl-8-quinolinol dihydrochloride is collected and purified by recrystallization from ethanol; M. P. 197–8° C. with decomposition. The formula of this product is,

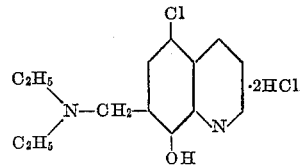

2 g. of 5-chloro-7-diethylaminomethyl-8-quinolinol dihydrochloride is dissolved in water, the solution made alkaline with sodium bicarbonate and the mixture extracted with ether. The ether solution of the free base is dried over potassium carbonate and the drying agent removed by filtration. The filtrate is treated with an excess of gaseous hydrogen bromide and the precipitated 5-chloro-7-diethylaminomethyl-8-quinolinol dihydrobromide collected and purified by recrystallization from ethanol.

1 g. of 5-chloro-7-diethylaminomethyl-8-quinolinol dihydrochloride is dissolved in water, the solution made alkaline with sodium bicarbonate and the liberated free base extracted with ether. The ether solution is dried over potassium carbonate, the drying agent removed by filtration and the filtrate treated with an excess of 85% phosphoric acid. The precipitated phosphate salt is collected and purified by crystallization from ethanol.

*Example 2*

A mixture consisting of 4.5 g. of 5-chloro-8-quinolinol, 1.2 g. of paraformaldehyde and 2.1 g. of dimethylamine hydrochloride in 100 cc. of ethanol is heated under reflux for three hours. The reaction mixture is cooled, filtered and the filtrate evaporated until the white crystalline product starts to separate from the solution. The mixture is cooled and the insoluble 5-chloro-7-dimethylaminomethyl-8-quinolinol monohydrochloride of formula,

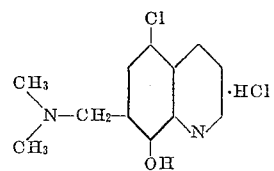

collected. Recrystallization from ethanol yields the pure product; M. P. 232–4° C. with decomposition.

*Example 3*

A mixture consisting of 4.5 g. of 5-chloro-8-quinolinol, 1.2 g. of paraformaldehyde and 3 g. of piperidine hydrochloride in 200 cc. of ethanol is heated under reflux for three hours. The reaction mixture is cooled, filtered and the filtrate concentrated to the point of crystallization. The yellow crystals of the desired 5-chloro-7-(1-piperidylmethyl)-8-equinolinol monohydrochloride of formula,

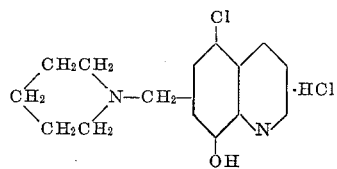

are collected and recrystallized from ethanol; M. P. 222–4° C. with decomposition.

By substituting 3.1 g. of morpholine hydrochloride for the piperidine hydrochloride used in the above procedure one obtains 5-chloro-7-(4-morpholinylmethyl)-8-quinolinol monohydrochloride.

*Example 4*

A mixture consisting of 4 g. of 5-chloro-8-quinolinol, 1 g. of paraformaldehyde, 2 g. of N-ethyl monoethanolamine and 100 cc. of ethanol is heated under reflux for one and a half hours. The ethanol is distilled from the reaction mixture and the residue taken up in anhydrous ether. The solution is treated with an excess of gaseous hydrogen chloride and the solid which separates collected. Recrystallization of this solid product from ethanol yields the desired 5-chloro-7-(ethyl-β-hydroxyethylamino)-8-quinolinol dihydrochloride as a yellow solid; M. P. 180–2° C. with decomposition. The formula of this product is,

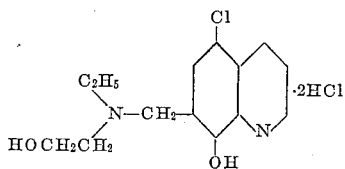

*Example 5*

A mixture consisting of 4 g. of 5-chloro-8-quinolinol, 1 g. of paraformaldehyde, 2.23 g. of di-n-propylamine and 100 cc. of ethanol is heated under reflux for two hours. The solvent is removed by distillation and the residue taken up in anhydrous ether. The solution of the free base of 5-chloro-7-(di-n-propylaminomethyl)-8-quinolinol is treated with an excess of dry hydrogen chloride and the solid product collected. Recrystallization from ethanol yields the desired 5-chloro-7-(di-n-propylaminomethyl)-8-quinolinol dihydrochloride as a hygroscopic yellow solid. The formula of this product is,

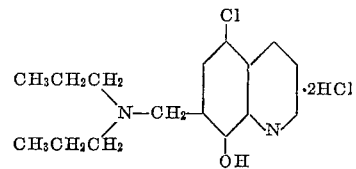

*Example 6*

A mixture consisting of 4 g. of 5-chloro-8-quinolinol, 1 g. of paraformaldeyhde, 2.9 g. of di-n-butylamine and 100 cc. of ethanol is heated under reflux for one and a half hours. The ethanol is removed by distillation and the residual free base of 5-chloro-7-(di-n-butylaminomethyl)-8-quinolinol taken up in anhydrous ether. The solution is treated with an excess of dry hydrogen chloride, the dihydrochloride salt of 5-chloro-7-(di-n-butylaminomethyl)-8-quinolinol collected and recrystallized from ethanol. The formula of this product is,

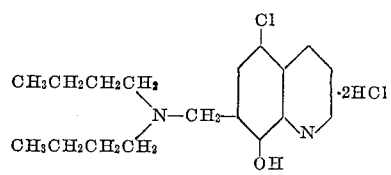

*Example 7*

A mixture consisting of 4 g. of 5-bromo-8-quinolinol, 0.54 g. of paraformaldehyde, 1.9 cc. of diethylamine and 160 cc. of ethanol is heated under reflux for one hour. The reaction mixture is filtered and the filtrate evaporated to dryness. The residue is taken up in anhydrous ether and the solution treated with an excess of gaseous hydrogen chloride. The ether is removed by decantation and the residue recrystallized from ethanol to obtain the desired 5-bromo-7-diethylaminomethyl-8-quinolinol dihydrochloride as golden crystals; M. P. 197–8° C. The formula of this product is,

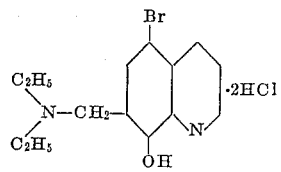

*Example 8*

An ethanol solution of 0.37 g. of paraformaldehyde and 1.2 cc. of piperidine is mixed with an ethanol solution of 2.2 g. of 6-chloro-8-quinolinol. The mixture is heated on a steam bath for ten minutes and then evaporated to a small volume in vacuo. An excess of dry hydrogen chloride is bubbled into the solution and the mixture diluted with ether. The heavy black syrup is separated, washed with several portions of acetone and purified by recrystallization from isopropanol. The pure 6-chloro-7-(1-piperidylmethyl)-8-quinolinol dihydrochloride hemihydrate so obtained is a gray-white solid; M. P. 198–9° C. The formula of this product is,

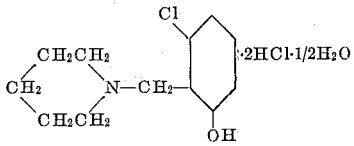

*Example 9*

A mixture consisting of 8 g. of 5-bromo-8-quinolinol, 1.08 g. of paraformaldehyde, 1.32 g. of methylethylamine and 300 cc. of ethanol is heated under reflux for one hour. The reaction mixture is filtered and the ethanol distilled from the filtrate. The residue is taken up in anhydrous ether, the solution treated with an excess of gaseous hydrogen bromide and the insoluble dihydrobromide salt of 5-bromo-7-(methylethylaminomethyl)-8-quinolinol collected. Recrystallization from ethanol yields the pure product. The formula of this compound is,

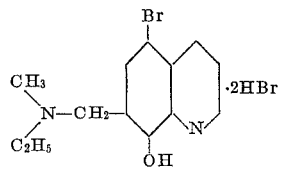

*Example 10*

A mixture consisting of 8 g. of 5-chloro-8-quinolinol, 1.35 g. of paraformaldehyde, 3.4 g. of pyrrolidine and 500 cc. of ethanol is heated under reflux for one hour. The mixture is filtered, the ethanol evaporated from the filtrate and the residue taken up in anhydrous ether. The solution is treated with an excess of dry hydrogen chloride and the crude dihydrochloride salt collected. Recrystallization from ethanol yields the desired 5-chloro-7-(1-pyrrolidinylmethyl)-8-quinolinol dihydrochloride. The formula of this product is,

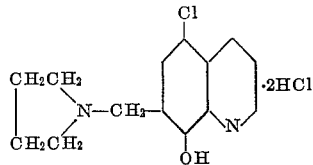

*Example 11*

A mixture consisting of 4.5 g. of 6-chloro-8-quinolinol, 1.2 g. of paraformaldehyde and 2.1 g. of dimethylamine hydrochloride in 100 cc. of ethanol is heated under reflux for two hours. The reaction mixture is filtered, the filtrate is concentrated to the point of crystallization and cooled. The white crystalline monohydrochloride salt of 6-chloro-7-dimethylaminomethyl-8-quinolinol is collected and purified by recrystallization from ethanol. The formula of this product is,

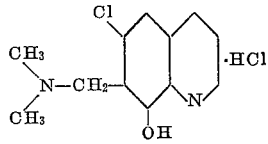

*Example 12*

A mixture consisting of 8 g. of 6-chloro-8-quinolinol, 1.35 g. of paraformaldehyde, 5 cc. of diethylamine and 500 cc. of ethanol is heated under reflux for one hour. The mixture is filtered, the filtrate evaporated to dryness and the residue taken up in anhydrous ether. The solution is treated with an excess of gaseous hydrogen chloride; the solid product is collected and purified by recrystallization from ethanol. The product thus obtained is the dihydrochloride salt of 6-chloro-7-diethylaminomethyl-8-quinolinol of formula,

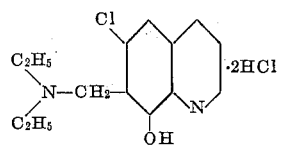

*Example 13*

A mixture consisting of 2.94 g. of 5-fluoro-8-quinolinol, 0.54 g. of paraformaldehyde, 1.9 cc. of diethylamine and 150 cc. of ethanol is heated under reflux for one hour. The mixture is filtered and the filtrate concentrated to a small volume in vacuo. The residue is diluted with dry ether and the resulting solution treated with an excess of gaseous hydrogen chloride. The precipitated dihydrochloride salt is collected, dissolved in water and the solution made alkaline with ammonium hydroxide. The solid free base of 5-fluoro-7-diethylaminomethyl-8-quinolinol is collected and purified by recrystallization from petroleum ether-benzene mixture or dilute ethanol; M. P. 78–80° C. The formula of this yellow crystalline product is,

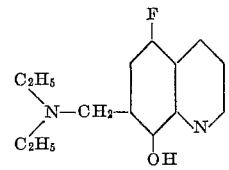

What I claim is:

1. A compound of the class consisting of a free base and its acid addition salts, said free base having the formula,

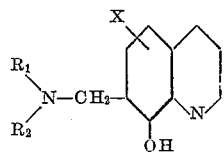

where X is a halogen atom and $R_1$ and $R_2$ are members of the class consisting of lower alkyl and lower hydroxy alkyl radicals and further members wherein, taken together with —N<, they form a saturated heterocyclic radical of the class consisting of piperidino, morpholino and pyrrolidino.

2. An acid addition salt of a compound having in its free base form the formula,

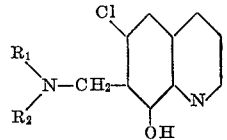

where $R_1$ and $R_2$ are lower alkyl radicals.

3. An acid addition salt of a compound having in its free base form the formula,

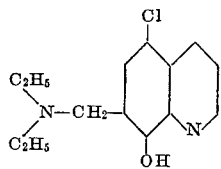

4. An acid addition salt of a compound having in its free base form the formula,

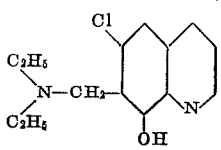

5. 5 - chloro - 7 - diethylaminomethyl - 8-quinolinol dihydrochloride.
6. 6 - chloro - 7 - diethylaminomethyl - 8-quinolinol dihydrochloride.
7. 5 - chloro - 7 - (1 - piperidylmethyl) - 8-quinolinol monohydrochloride.
8. 5 - chloro - 7 - (ethyl - $\beta$ - hydroxyethylamino)-8-quinolinol dihydrochloride.
9. 6 - chloro - 7 - (1 - piperidylmethyl) - 8-quinolinol dihydrochloride hemihydrate.

References Cited in the file of this patent

Burckhalter et al., J. Am. Chem. Soc., vol. 68, p. 1900 (1946).